April 12, 1938. A. W. WENZEL 2,114,007
PISTON SKIRT EXPANDER
Filed June 17, 1936
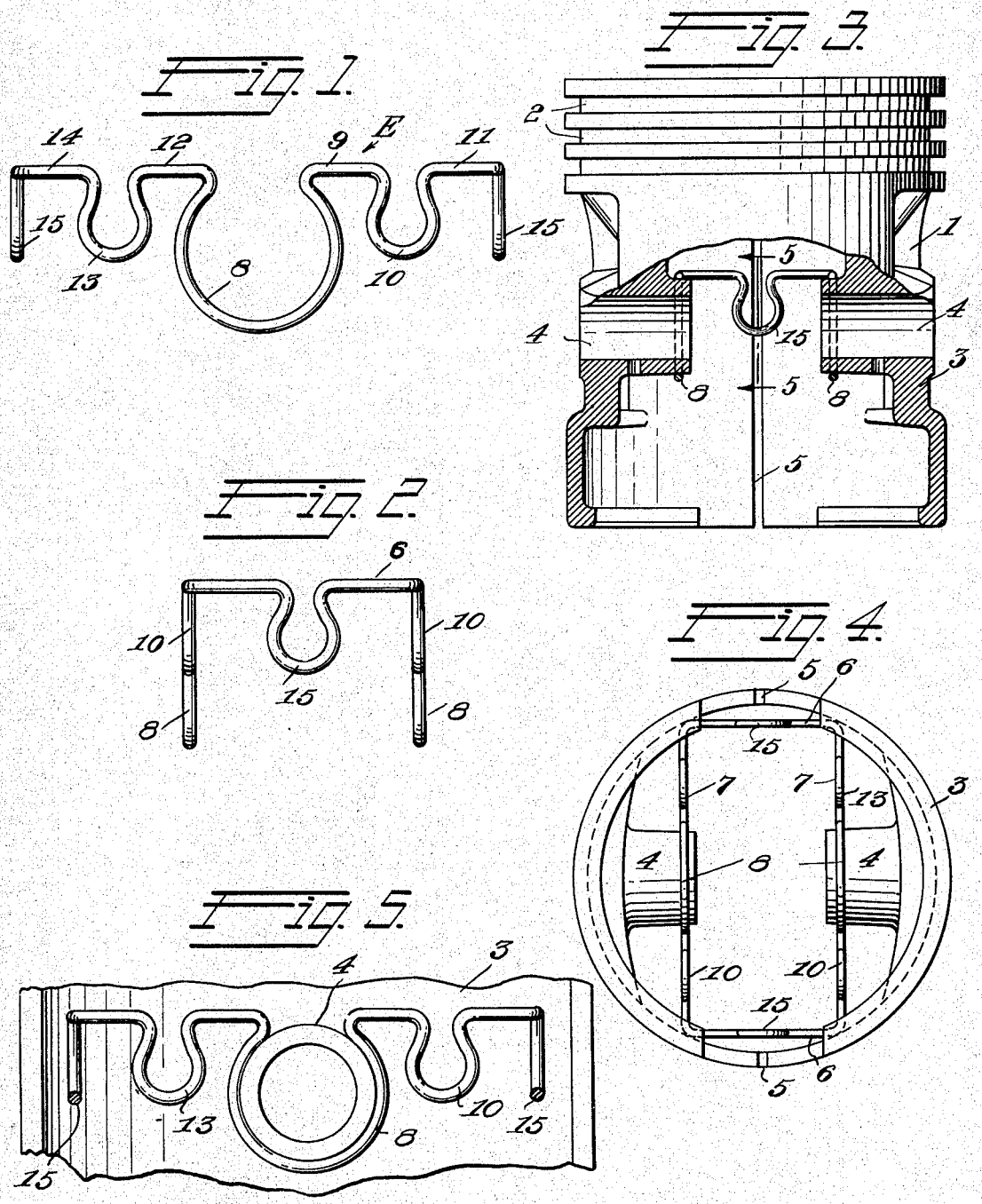
Inventor
Albert W. Wenzel.
Parker Cook
By
Attorney Patented Apr. 12, 1938

2,114,007

UNITED STATES PATENT OFFICE 2,114,007

PISTON SKIRT EXPANDER

Albert W. Wenzel, Paterson, N. J.; Fidelity Union Trust Company executor of said Albert W. Wenzel, deceased Application June 17, 1936, Serial No. 85,771

3 Claims. (Cl. 309—12)

My invention relates to new and useful improvements in piston skirt expanders, and has for an object to provide a simple and inexpensive means for efficiently expanding the skirts of new or worn pistons.

As is well known to those skilled in the art, slightly worn pistons have a tendency to "piston slap", and if the skirt can be expanded in an efficient manner, the slapping can be overcome.

One of the principal objects of the present invention is to provide a piston skirt expander formed from a properly tempered spring wire, the expander having two end and two side portions and loops or eyelets formed both in the side and in the opposite end portions.

Still another object of the invention is to provide a piston skirt expander formed from properly tempered wire substantially rectangular in form and having loops in both the sides and the ends and also a relatively large loop in each of the side portions that fit about the bearings in the piston head which accommodate the wrist pins.

Still another object of the invention is to provide a piston skirt expander formed of wire that is to be pressed or snapped in position in the piston skirt, this being possible in that the loops both in the sides and ends of the expander will compress when the piston expander is forced under slight presure into position. Then, after the expander is in position, there will be a spreading action provided, which, although relatively light, will tend to spread the skirts an additional five to twenty ten-thousandths of an inch, which is usually sufficient to prevent the objectionable slapping of the pistons.

Still another object of the invention is to provide an especially resilient form of skirt expander having integral loops in the sides of the expander as well as in the end portions, so that the expander will tend to expand the piston skirt in an efficient manner.

Still another object of the invention is to provide a piston skirt expander in which it is not necessary to have any adjustable parts, the expander being exceedingly flexible and, therefore, capable of being compressed while being fitted or snapped into the piston and remaining under compression while in position.

With these and other objects in view, the invention consists in certain new and novel features and combination of parts, as will be hereinafter more fully explained and pointed out in the claims.

In the drawing showing a preferred embodiment,

Fig. 1 is an enlarged side view of my improved piston skirt expander showing a properly tempered piece of wire bent to form the small loops and the large loop, which latter fits about the bearing of the wrist pin;

Fig. 2 is a front view of the same;

Fig. 3 is a side elevation partly in section of a piston showing the split skirt and showing the expander snapped into position to keep the skirt in its expanded position.

Fig. 4 is a bottom plan view of the piston showing the expander in position;

Fig. 5 is an enlarged sectional view taken on the line 5—5 of Fig. 3.

Referring now to the drawing, and for the moment to Fig. 3, there is shown a piston 1 with the annular grooves 2 for the reception of the piston ring and oil rings. There may also be seen the skirt 3 with the bearings 4 for the reception of the wrist pin of a connecting rod (not shown). The skirt is conventionally split, as at 5, that is, at right angles to the axis of the wrist pin bearings.

It will be understood that I do not wish to be limited to the specific piston or the manner in which the skirt is split, as these expanders may be very efficiently used with other forms of split skirt pistons.

Referring now to Figs. 1 and 2 for the moment, there will be seen the piston skirt expander E, rectangular in form (see Fig. 4), which consists of the two end portions 6 and the two side portions 7, all of which make up the continuous frame.

It will be understood that the two end portions are similar in construction and that the two side portions are similar to each other, so a description of one side portion and one end portion will suffice.

It will also be understood that the expander will be made on a proper jig and from a single piece of wire, so that after the ends are soldered, the expander is, in form, an integral structure.

Glancing at Fig. 1 for the moment, it will be noticed that the side frame has formed therein the relatively large circular loop 8, which is of sufficient size to be snapped about the bearing 4 of the piston. The loop will have to be spread, but the resiliency of the wire will permit it to snap back, so that after the expander is in position, it will remain this way.

It will be noticed that the wire from one edge of the loop extends to the right to form the horizontal portion 9 and again is bent to form the smaller eyelet or loop 10 and then extends, as at 11, in a horizontal plane to the end portion.

In a like manner, still referring to Fig. 1, from the left of the loop 8, the formation is repeated, that is, there are the horizontal portion 12, the loop 13, and the horizontal portion 14. This bending and arranging of the loops is carried out on the other side portion of the frame, as will be readily understood.

Referring to Fig. 2 for the moment, it will be seen that the end portion 7 has the centrally formed loop 15 with the outwardly extending legs that merge with the two side frame portions. These expanders may be made accurately and their rectangular formation is such that all four corners will bear against the four points in the piston skirt, as shown in Fig. 4, to tend to force the split portions of the skirt apart and thus prevent any slapping of the piston in the cylinder.

The placing of the piston skirt expander in position is but the matter of a moment, as the expander is sufficiently flexible to be compressed, that is, to have the loops compressed, the large loop 8, however, being opened to be forced about the bearings 4. After these large loops encircle the bearings or, in other words, are snapped into place, there is no possibility of the expander becoming dislodged.

By providing the loops 8, 10, and 13 in the side portions of the expander, and by also providing the loops 15 at the opposite ends of the expander, there is a great flexibility in the expander as a whole and a slight pressure will be exerted both longitudinally of the expander and transversely thereof. The loops, of course, are of such depth that the expander can be easily compressed, and also give the desired resiliency to the frame as a whole.

By forming the expander in this manner, there is no necessity for providing adjustment features, which would make the expander costly, and, at the same time, the flexibility of the expander is such that the skirts will be expanded in a proper and efficient manner.

As heretofore mentioned, these expanders can be conveniently and quickly made on jigs and then properly hardened and tempered to provide the desired flexibility and resiliency. Also, they may be made in different sizes or even different shapes to fit differently sized pistons.

I am aware that it is old to have piston skirt expanders with loops in the side frames and adjustable features and do not claim my invention as such, but what I do claim and desire to secure by Letters Patent is:—

1. An expander for a slotted piston having skirt portions and wrist pin bearings comprising a spring wire member adapted to be disposed on the inner side of the skirt portions and having loops adapted to snap over the wrist pin bearings, the member also having spring loops formed in its ends and sides which are compressed when the expander is placed in position and thereafter exert an expanding action on the slotted skirt portions.

2. An expander for slotted piston skirts having wrist pin bearings, comprising a spring member endless in form and substantially rectangular in shape and of slightly larger size than the internal diameter of the piston skirt, spring loops formed continuously in the expander and adapted to be compressed slightly when the expander is forced into position to thereby thereafter exert an expanding action on the skirt, and additional loops formed in the side members of the expander adapted to snap over the wrist pin bearings of the piston.

3. A piston skirt expander for a slotted piston comprising a wire endless in form and having side and end portions, integral loops formed in the side portions and extending in a plane parallel with the longitudinal axis of the expander, and integral loops formed in the end portions and extending in planes at right angles to the longitudinal axis of the expander whereby when the expander is snapped into position within the piston skirt it will exert both a longitudinal and lateral expanding effort thereon.

ALBERT W. WENZEL.